Feb. 10, 1970 H. NESTLE 3,494,623

PHONOGRAPH RECORD PLAYER

Filed April 18, 1968 4 Sheets-Sheet 1

Feb. 10, 1970 H. NESTLE 3,494,623

PHONOGRAPH RECORD PLAYER

Filed April 18, 1968 4 Sheets-Sheet 4

1

3,494,623

PHONOGRAPH RECORD PLAYER

Hanspeter Nestle, St. Georgen, Black Forest, Germany, assignor to Firma Perpetuum Ebner, Fabrik fur Feinmechanik und Elektrotechnik Steidinger & Co., Komm. Ges., St. Georgen, Black Forest, Germany, a corporation of Germany Filed Apr. 18, 1968, Ser. No. 722,409

Claims priority, application Germany, Dec. 1, 1967, P 43,514

Int. Cl. G11b *3/16*

U.S. Cl. 274—23 7 Claims

ABSTRACT OF THE DISCLOSURE

The invention relates to a phonograph record player having a single control system for the adjustment of the stylus pressure force and antiskating force produced by a pair of springs acting on the tone arm.

Antiskating systems on tone arms of phonograph record players are known which, by means of the force of gravity or of springs, exercise a torque on the tone arm as it contacts a phonograph record, so as to compensate for the skating force produced as a result of the length of the tone arm and the friction between the stylus and the record and directed toward the center of the record. In one prior art system (disclosed in German Patent No. 1,194,173), a weight acts through a lever arm on the tone arm and compensates for the skating force. In another known system (disclosed in German Patent No. 1,217,091) a control knob for the adjustment of the antiskating force is coupled through a toothed system with a member controlling the adjustment of the stylus pressure. In this arrangement, however, the engagement of the coupling requires a manual operation which must be performed anew each time. Since in the normal setting of this known arrangement the stylus pressure and antiskating force are easily variable individually, the fixed ratio existing between these forces can easily undergo variations. The correction of these variations cannot be performed in a simple manner. The result of this is differences in the surface pressure on the flanks of the grooves in the record, and optimum quality is not achieved in the playing of the record.

One object of the present invention is to combine together the adjusting means associated with the antiskating force on the one hand and the stylus pressure on the other in such a manner that the forces, which are in a fixed ratio to one another, are constantly adjustable through a common control.

The solving of this problem is brought about according to the present invention by the fact that two cams are provided which are constantly coupled with one another, are disposed on a common axis of rotation, and are adjustable by a single control, the one of these cams acting through coupling members on a spring producing the stylus pressure and the other acting through corresponding coupling members on a spring supplying the antiskating force .

In one preferred embodiment of the invention the two control cams are drivingly coupled together by means of a friction disk in such a manner that the two control cams are adjustable relatively to one another. This arrangement has the advantage that in this manner the fixed ratio between antiskating force and stylus pressure can be readjusted, while at the same time the setting of the two forces always is performed through a single common control after the preliminary adjustment has been made.

2

It is furthermore advantageous if the spring producing the antiskating force is connected to the housing of the record player by an adjusting means, because in this manner another possibility is provided for varying the antiskating torque acting on the tone arm.

In one preferred embodiment of the invention, the spring serving for the adjustment of the stylus pressure is connected to the free end of a single-arm lever which follows the control cam by means of a follower pin, while the spring serving for the adjustment of the antiskating force is connected with the one leg of a bell crank on whose other leg a push rod urged against the cam is articulated.

The tone arm, according to the invention, is preferably arranged so as to pivot vertically on a bracket which is horizontally rotatable and on which the control cams together with the operating means in the form of a control knob, and the levers serving for the adjustment of the springs, are mounted, the control knob being affixed to a hollow shaft bearing the control cam, and a shaft bearing the other control cam being force-transmittingly mounted in the said hollow shaft.

The following description of preferred embodiments will serve for further explanation, in conjunction with the annexed drawings, wherein.

Figure 1:
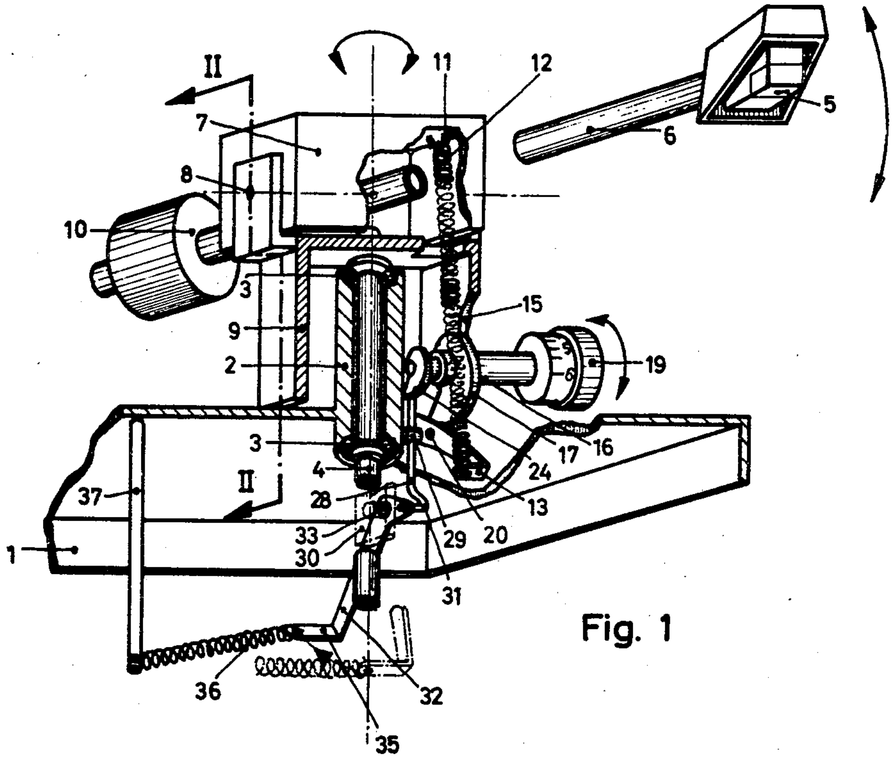
FIG. 1 is a perspective sectioned view of a phonograph record player with tone-arm mounting according to the invention.

A quill 2 is integrally combined with a mounting plate 1 of a phonograph record player. A shaft 4 is vertically mounted by means of ball bearings 3 in quill 2, and a tone arm 6 provided with a pickup system 5 can swing back and forth in a horizontal plane about said shaft. The tone arm 6 is in turn fixedly joined to a crosspiece 7 which is mounted by means of a point suspension 8 (FIG. 2) in a bracket 9 having a U-shaped upper part, the said crosspiece permitting a pivoting of tone arm 6 in the vertical plane. The tone arm 6 is furthermore provided on its end opposite the pickup system 5 with an adjustable counterweight 10. Bracket 9 is affixed to the bearing shaft 4, for example by force-fitting.

Figure 2:
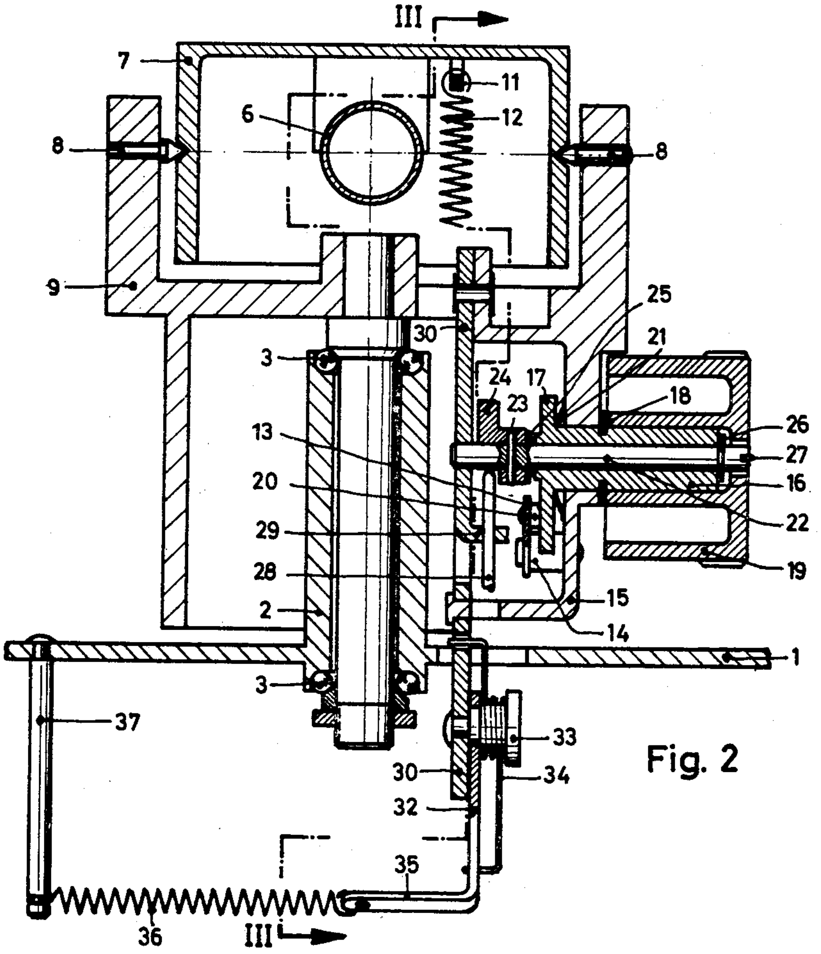
FIG. 2 is a sectional elevation along line II—II of FIG. 1.

A hook 11 is provided in crosspiece 7 in front of the point suspension 8, and a tension spring 12 producing the stylus pressure of tone arm 6 is hung on said hook. The extremity of tension spring 12 that is directed downward and away from hook 11 is engaged in the bent free end of the lever 13 which is pivotingly mounted on a pivot pin 14 (FIG. 2). The pivot pin 14 is in turn held on a bearing bracket 15 that is part of bracket 9.

On bearing bracket 15 there is also rotatably mounted a hollow shaft 16 which is integrally joined at its one extremity to a snail-shell-shaped control cam 17. Hollow shaft 16 is held by means of a shaft keeper 18. A friction disk 21 between control cam 17 and bearing bracket 15 produces a drag on hollow shaft 16. The extremity of hollow shaft 16 that projects from bearing bracket 15 is affixed to a turning means in the form of a control knob 19 which serves for the turning of hollow shaft 16.

On the previously mentioned lever 13 there is provided a follower pin 20 which is held by spring 12 in engagement with the cam 17 and glides thereon when this cam is rotated. Thus, the turning of the cam 17 by means of control knob 19 permits the bias of spring 12 to be varied and hence the stylus bearing force imparted to the tone arm 6.

In hollow shaft 16 there is mounted a shaft 22 to which another cam 24 is affixed as by means of a pin 23 (see FIG. 2), the latter having, for example a snail-shell shape. Between cam 24 and cam 17 there is provided a friction disk 25 by means of which the two cams are force-transmittingly connected with one another, so that, when the knob 19 is turned, both cams are rotated together. Shaft 22 is furthermore secured on hollow shaft 16 by a shaft keeper 26. At one end of shaft 22, which is accessible through the knob 19, there is provided a slot 27 for cooperation with a screw driver or other such tool. By means of such a screw driver inserted into slot 27 it is possible, while holding knob 19 fast, to produce a relative displacement of the two cams 17 and 24 which are coupled together only by the friction disk 25.

The free end of a push rod 28 lies against cam 24, being slidingly mounted in a projection 29 of a mounting plate 30 joined to bracket 9. The lower, bent extremity 31 of push rod 28 is pivotally joined to one arm of a bell crank 32 which is pivotingly mounted by means of a pin 33 on the mounting plate 30 and is biased by a spring 34. The bias imparted by spring 34 is such that the push rod 28 is held in contact against cam 24. The other, bent arm 35 of bell crank 32 is attached to one end of a tension spring 36 whose other end is fastened to a pin 37 affixed to mounting plate 1.

The spring 36 attached to arm 35 of bell crank 32 serves for the production of the antiskating force. When the setting of cam 24 pivots bell crank 32 to such an extent that the point of attachment of spring 36—as shown in broken lines in FIG. 1—is precisely on the axis of the tone arm bearing shaft 4, no antiskating force is exercised on the tone arm, because the point of attachment of spring 36 located on the axis of rotation of the tone arm can produce no torque. Torque is not produced until—as shown in solid lines in FIG. 1—bell crank 32 is pivoted so that the point of attachment of spring 36 to arm 33 of the bell crank lies outside of the axis of the bearing shaft 4. In this manner it is possible by suitable adjustment of cam 24 to adjust the torque and hence the antiskating force from zero up.

Figure 5:
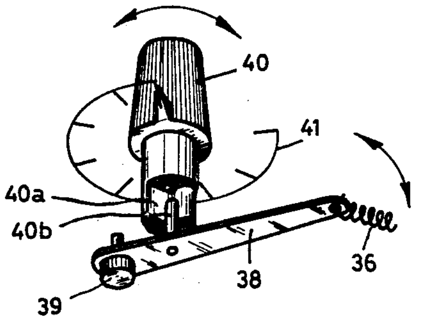
FIG. 5 is a perspective view of an adjusting means for separately controlling the antiskating force according to the invention.

As represented in FIG. 5, in a modified embodiment of the invention, the end of spring 36 that is connected to pin 37 affixed to the housing in the previously described embodiment, is instead attached to a lever 38 which is mounted by means of a pin 39 on mounting plate 1, and can be pivoted by means of a knob 40. For this purpose there is a pin 40*b* on lever 38 which is biased on spring 36 against a cam 40*a* affixed to knob 40. When knob 40 is turned, lever 38 pivots and in this manner the force of spring 36 can be adjusted, thereby providing a control over the torque producing the antiskating force.

As shown in FIG. 1, knob 19 is provided with a scale to provide a reading of the adjusted antiskating force and stylus pressure. Furthermore, knob 40 shown in FIG. 5 cooperates with a scale 41 by means of which the adjustment of spring 36 can be read.

When the phonograph record player according to the invention is operated, first the desired stylus pressure of tone arm 6 is adjusted, this being done by the appropriate adjustment of cam 17 by means of knob 19, and then, with knob 19 held fast, the antiskating force associated with this stylus pressure is adjusted by turning shaft 22 by means of a tool introduced into slot 27. After this, when knob 19 is turned, the two cams 17 and 24 always turn together on account of the friction disk 25 interposed between them, so that the antiskating force and the stylus pressure are always adjusted together while preserving the ratio initially set. Nevertheless the possibility always exists for varying the antiskating force individually by means of the knob 40 shown in FIG. 5.

Figure 3:
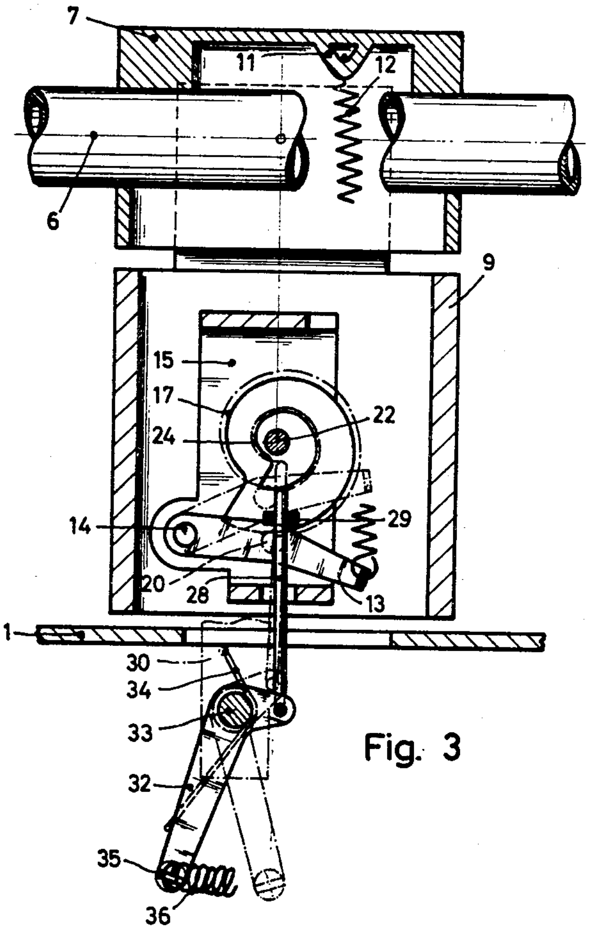
FIG. 3 is a sectional view along line III—III of FIG. 2.
Figure 4:
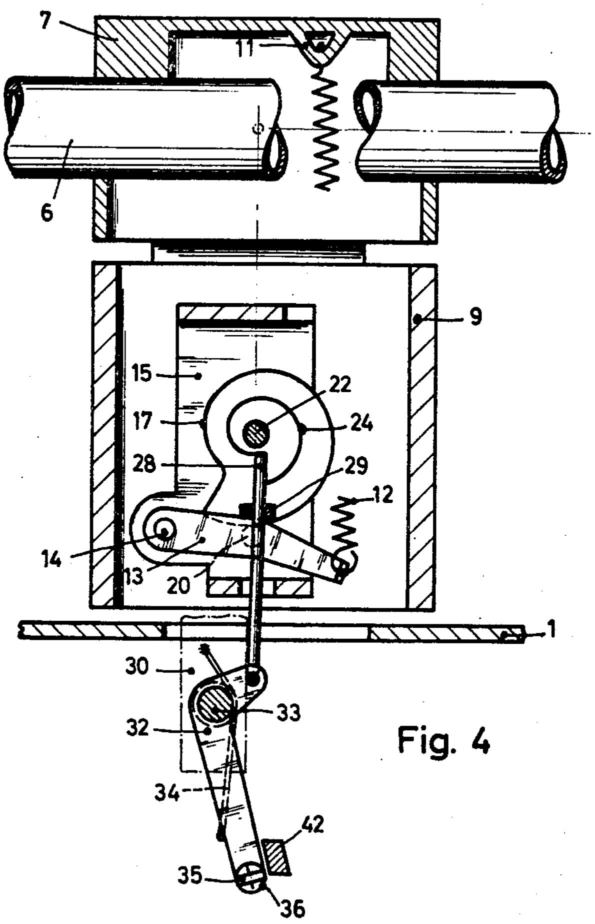
FIG. 4 is a sectional view similar to FIG. 3 in another operating position.

In FIGS. 3 and 4 there are shown various relative positions of the two cams 17 and 24 and of the levers associated with them, 13 and 32 respectively. FIG. 3 shows in solid lines the position in which the antiskating force and the stylus pressure are both at a maximum. In the position represented by broken lines in FIG. 3 these two forces are at a minimum. FIG. 4, on the other hand, shows a different relative setting of the two cams and of the levers associated therewith. In this case, since arm 35 of bell crank 32 lies precisely on the axis of rotation of the tone arm, the antiskating force is zero, while spring 12, which is given maximum deflection by control cam 17 and lever 13, provides a maximum stylus pressure.

The position of bell crank 32, represented in broken lines in FIG. 3 and in solid lines in FIG. 4, in which, as described above, the antiskating force is zero, is preferably associated with a stop 42 (FIG. 4) affixed to the housing, in the practical application of the invention, so as to indicate to an operator that this position has been reached.

What is claimed is:

1. In phonograph record players having a tone arm mounted on a mounting plate for pivotal movement about vertical and horizontal axes, the combination including first adjustable biasing means for regulating the downward force exerted by the tone arm, second adjustable biasing means for regulating the lateral antiskating force exerted by the tone arm, said first biasing means including a first rotary cam means, said second biasing means including a second rotary cam means mounted concentrically with the first cam means, and common regulating means for adjusting both said biasing means simultaneously, said common regulating means including a single rotary control means and means connecting said first and second cam means with the single rotary control means for rotation of both cam means simultaneously.

2. The invention as defined in claim 1 wherein said means connecting said first and second cam means includes friction clutch means, whereby the relative angular relationship between said cam means may also be adjusted.

3. The invention as defined in claim 1 wherein said second biasing means includes a spring and means for connecting said spring between said tone arm and said mounting plate spaced from the vertical axis of the tone arm wherein said second adjustable biasing means includes spring means, said common regulating means includes adjustable means for positioning one end of the spring means, and adjustable connecting means for positioning the other end of said spring means independently of the common regulating means.

4. The invention as defined in claim 1 wherein said first biasing means includes a spring having one end connected with the tone arm, the other end being connected with a pivotally mounted cam follower lever, said follower lever being operatively connected with said first rotary cam means.

5. The invention as defined in claim 1 wherein said second biasing means include a spring having one end connected with the mounting plate, the other end being connected with one end of a bell crank lever pivotally mounted on said tone arm for rotation about a horizontal axis, the other end of the bell crank lever being operatively connected with said second rotary cam means.

6. The invention as defined in claim 1 wherein said mounting for the tone arm includes bracket means pivotally attached to the mounting plate for movement about a vertical axis, said tone arm being pivotally attached to the bracket means for movement about a horizontal axis, said common regulating means including a rotatable knob mounted on said bracket means, said first and second biasing means including first and second spring means respectively and first and second cam means respectively operatively connected to vary the force of said respective spring means, said cam means being rotatably mounted on said bracket means and operatively connected with said rotatable knob.

7. The invention as defined in claim 6 wherein one of said cam means and said knob are attached to a common hollow shaft means rotatably mounted on the bracket means, the other of said cam means being attached to another shaft means rotatably supported within said hollow shaft means.

References Cited

UNITED STATES PATENTS

| | | | |
|---|---|---|---|
| 3,088,742 | 5/1963 | Alexandrovich | 274—23 |
| 3,417,999 | 12/1963 | Freier | 274—23 |
| 3,315,967 | 4/1967 | Laufer | 274—23 |

LEONARD FORMAN, Primary Examiner

R. A. FIELDS, Assistant Examiner